United States Patent
Ghosh et al.

(10) Patent No.: US 11,093,931 B2
(45) Date of Patent: Aug. 17, 2021

(54) METHOD AND SYSTEM FOR AUTHENTICATING DIGITAL TRANSACTIONS

(71) Applicant: Visa International Service Association, San Francisco, CA (US)

(72) Inventors: Pamela Ghosh, Bengaluru (IN); Rajagopal Prabhakar, Mumbai (IN); Sachin Ramchandani, Mumbai (IN); Pramod Mulani, Mumbai (IN); Hemanth Kumar Manoharan, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/961,775

(22) PCT Filed: Jan. 14, 2020

(86) PCT No.: PCT/US2020/013455
§ 371 (c)(1),
(2) Date: Jul. 13, 2020

(87) PCT Pub. No.: WO2020/150201
PCT Pub. Date: Jul. 23, 2020

(65) Prior Publication Data
US 2020/0394640 A1    Dec. 17, 2020

(30) Foreign Application Priority Data
Jan. 15, 2019 (IN) .............................. 201941001778

(51) Int. Cl.
*G06Q 20/30* (2012.01)
*G06Q 20/32* (2012.01)
(Continued)

(52) U.S. Cl.
CPC .......... *G06Q 20/326* (2020.05); *G06Q 20/34* (2013.01); *G06Q 20/409* (2013.01);
(Continued)

(58) Field of Classification Search
USPC ....................................................... 705/35, 44
See application file for complete search history.

(56) References Cited

U.S. PATENT DOCUMENTS

| 9,906,493 B1 * | 2/2018 | Rodgers | .............. H04L 61/2015 |
| 2009/0013181 A1 * | 1/2009 | Choi | ..................... H04L 63/123 713/168 |

(Continued)

OTHER PUBLICATIONS

Implicit Identity Based Device Attestation Version 1.0 Revision 0.93 Mar. 5, 2018 (Year: 2018).*

(Continued)

*Primary Examiner* — William E Rankins
(74) *Attorney, Agent, or Firm* — The Webb Law Firm

(57) ABSTRACT

A system and computer-implemented method for authenticating digital transactions. The method includes receiving a device registration request and a device attestation response including at least a device integrity status from a device. In response to the device registration request, the method includes providing a device registration response to the device, based on validation of the device integrity status. Further, the method includes receiving a first payment transaction request and an enrolment request from the device via an application to authenticate a second payment transaction request using a first type of authentication technique. Finally, the method includes enrolling the device to the first type of authentication technique and providing a second token to the device based on a result of the first payment transaction request, wherein the second token is used for authenticating the second payment transaction request.

19 Claims, 9 Drawing Sheets

(51) Int. Cl.
*G06Q 20/34* (2012.01)
*G06Q 20/40* (2012.01)
*H04L 9/32* (2006.01)

(52) U.S. Cl.
CPC ....... *G06Q 20/4016* (2013.01); *H04L 9/3213* (2013.01); *G06Q 2220/00* (2013.01); *H04L 2209/56* (2013.01)

(56) References Cited

U.S. PATENT DOCUMENTS

| | | | |
|---|---|---|---|
| 2014/0032920 A1* | 1/2014 | Gehrmann | H04L 9/0822 713/176 |
| 2014/0066015 A1* | 3/2014 | Aissi | G06F 21/57 455/411 |
| 2016/0224973 A1 | 8/2016 | Van Os et al. | |
| 2016/0275461 A1* | 9/2016 | Sprague | G06Q 20/0655 |
| 2017/0300904 A1 | 10/2017 | Chung et al. | |
| 2018/0047023 A1* | 2/2018 | Bouda | G06Q 20/20 |
| 2018/0254898 A1 | 9/2018 | Sprague et al. | |
| 2018/0336559 A1 | 11/2018 | Shah et al. | |
| 2018/0349909 A1* | 12/2018 | Allen | G06Q 20/40145 |
| 2018/0359244 A1* | 12/2018 | Cockerill | H04L 63/0876 |
| 2019/0199530 A1* | 6/2019 | Reitsma | H04L 9/3247 |

OTHER PUBLICATIONS

Device Attestation: Past, Present, and Future Orlando Arias*, Fahim Rahmant, Mark Tehranipoort, and Yier Jint *Department of Electrical and Computer Engineering, University of Central Florida tDepartment of Electrical and Computer Engineering, University of Florida (Year: 2018).*
Attestation and Trusted Computing Mar. 2006 J. Christopher Bare (Year: 2006).*
Emulating U2F Authenticator Devices Florian Reimair, Christian Kollmann, Alexander Marsalek Graz University (Year: 2016).*
LRAP: A location-based remote client authentication prototcol for mobile environments Diana Berbecaru (Year: 2011).*
Uni-directional trusted path: Transaction confirmation on just one device Atanas Filyanov, Jonathon M. McCune, et. el. (Year: 2011).*

* cited by examiner

── 401

```
{
  "timestamp": 9860437986543,
  "nonce": "R2Rra24fVm5xa2Mg",
  "PackageName": "com.package.name.of.requesting.app",
  "CertificateDigestSha256": ["base64 encoded, SHA-256 hash of the
                     certificate used to sign requesting app"],
  "ProfileMatch": true,
  "Integrity": true,
}
```

| Device Status | Value of ProfileMatch | Value of Integrity |
|---|---|---|
| Certified and genuine device | TRUE | TRUE |
| Certified device | FALSE | TRUE |
| Genuine but uncertified device, | FALSE | TRUE |
| Device with custom ROM | FALSE | TRUE |
| Emulator | FALSE | FALSE |
| No device | FALSE | FALSE |
| Signs of integrity compromised | FALSE | FALSE |
| Signs of other active attacks | FALSE | FALSE |

FIGURE 4B

| | 1st Authentication technique | 2nd Authentication technique | 3rd Authentication technique | 4th Authentication technique |
|---|---|---|---|---|
| Issuer A | 1 | 3 | 2 | 4 |
| Issuer B | 2 | 1 | X | 3 |
| Issuer C | X | X | 1 | 2 |

METHOD AND SYSTEM FOR AUTHENTICATING DIGITAL TRANSACTIONS

CROSS REFERENCE TO RELATED APPLICATION

This application is the United States national phase of International Application No. PCT/US2020/013455 filed Jan. 14,2020, and claims priority to Indian Provisional Patent Application No. 201941001778, filed Jan. 15, 2019, the disclosures of which are hereby incorporated by reference in their entirety.

BACKGROUND

1. Technical Field

The present disclosure relates to authentication of digital transactions. Particularly, but not exclusively, the present disclosure relates to a method and system for device enrollment and network-based authentication of digital transactions,

2. Technical Considerations

Recent trends indicate a drastic increase in mobile application based online payments (e.g., digital transactions) using smartphones. The online payments include card-on-file payments, Unified Payments Interface (UPI), net banking, and the like. For the card-on-file payments, one or more details of a payment card of a user are stored by a mobile application and the one or more details are used for initiating the digital transactions. The digital transactions are authenticated using one or more issuer authentication techniques, for example, a 3-D secure model. Alternatively, for payment transactions at a point of sale machine using a physical payment card, the user can initiate a network-based authentication. The network-based authentication eliminates the need for a Personal Identification Number (PIN), a password, and a One Time Password (OTP) for authenticating the payment transactions. The network-based authentication requires less time as compared with the one or more issuer authentication techniques and provides a higher payment success rate to the user.

An issue with the existing techniques is the lack of network-based authentication techniques for the online payments including the card-on-file payments. Further, the existing techniques lack a secure mechanism for initiating and processing the card-on-file payments because the network-based authentication techniques do not require a second factor authentication, for example, a PIN.

The information disclosed in this background of the disclosure section is only for enhancement of understanding of the general background of the disclosure and should not be taken as an acknowledgement or any form of suggestion that this information forms existing information already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method comprising: receiving, by at least one processor, a device registration request and a device attestation response including at least a device integrity status from a device; in response to the device registration request, providing, by at least one processor, a device registration response to the device, based on validation of the device integrity status; receiving, by at least one processor, a first payment transaction request and an enrolment request from the device via an application to authenticate a second payment transaction request using a first type of authentication technique; and enrolling, by at least one processor, the device to the first type of authentication technique and providing a second token to the device based on a result of the first payment transaction request, wherein the second token is used for authenticating the second payment transaction request.

In some non-limiting embodiments or aspects, the device registration request and the device attestation response are received after: the device provides to a second server, a device attestation request including at least a first token, upon receiving the device registration request including merchant information from the application; and the device receives from the second server, the device attestation response including at least the device integrity status based on the first token. In some non-limiting embodiments or aspects, providing the device registration response comprises: validating, by at least one processor, the device attestation response by verifying an origin of the device attestation response using one or more cryptographic techniques based on a first token; and in response to successful validation, sending, by at least one processor, the device registration response including at least a device identification value to the device; and in response to unsuccessful validation, sending, by at least one processor, the device registration response including at least an error message to the device. In some non-limiting embodiments or aspects, the enrolment request is received after a first server receives, via the application and from the device, the enrolment request including at least one of a consent for registering the application to the first type of authentication technique, merchant information, a payment amount and payment card information, wherein the at least one processor provides to the application at least one of a payment authentication request and an account identification value upon validation of the payment card information In some non-limiting embodiments or aspects, wherein receiving the first payment transaction request comprises receiving, by at least one processor, at least one of a payment authentication request and a payment authorization request from a first server, for completing a transaction associated between a user and a merchant using at least a payment card. In some non-limiting embodiments or aspects, the result of the first payment transaction request is received by at least one processor after facilitating, by at least one processor, processing of at least one of a payment authentication request and a payment authorization request based on one or more issuer authentication techniques. In some non-limiting embodiments or aspects, the enrollment of the device comprises: verifying, by at least one processor, a first payment authentication response received from the device with a second payment authentication response obtained while facilitating a payment authentication request based on one or more issuer authentication techniques; in response to successful verification, enrolling the device and the application to the first type of authentication technique; and generating the second token for authenticating the second payment transaction request using the first type of authentication technique, wherein the generated second token is provided to the device.

In some non-limiting embodiments or aspects, provided is a computer-implemented method comprising: determining, by at least one processor, one or more authentication techniques associated with at least one issuer; providing, by at least one processor, one or more determined authentication techniques to an application in a device registered with a payment server, wherein the one or more authentication techniques are displayed in the application for user selection; receiving, by at least one processor, a second payment transaction request with one of the one or more authentication techniques selected by the user; and providing, by at least one processor, a result of processing the second payment transaction request to the device, wherein the payment server facilitates the processing of the second payment transaction request.

In some non-limiting embodiments or aspects, determining the one or more authentication techniques comprises: receiving, by at least one processor and from the at least one issuer, a consent or a dissent for authenticating second payment transaction using the one or more authentication techniques; and identifying, by at least one processor, the one or more authentication techniques having the consent of the at least one issuer. In some non-limiting embodiments or aspects, the one or more authentication techniques comprise at least one of a first type of authentication technique, and one or more issuer authentication techniques.

In some non-limiting embodiments or aspects, providing the one or more authentication techniques to the application comprises: computing, by at least one processor, a risk value for each of the determined one or more authentication techniques based on at least one of merchant information, issuer information, and user information; and modifying the consent of the determined one or more authentication techniques based on the computed risk value, wherein the determined one or more authentication techniques are provided to the application. In some non-limiting embodiments or aspects, facilitating the processing the second payment transaction request when the one of the one or more authentication techniques selected by the user is a first type of authentication technique comprises: receiving, by at least one processor, the second payment transaction request including at least a device attestation response, a payment amount, a second token, merchant information, payment card information, a payment authentication request, and a payment authorization request; and generating, by at least one processor, a third token upon processing the payment authentication request and the payment authorization request, wherein the generated third token is provided to the device for authenticating a third payment transaction.

In some non-limiting embodiments or aspects, provided is a payment server for authenticating digital transactions, comprising: at least one processor; and a memory communicatively coupled to the at least one processor, wherein the memory stores processor instructions, which, upon execution, causes the at least one processor to: receive a device registration request and a device attestation response including at least a device integrity status from a device; in response to the device registration request, provide a device registration response to the device, based on validation of the device integrity status; receive a first payment transaction request and an enrolment request from the device via an application to authenticate a second payment transaction request using a first type of authentication technique; and enroll the device to the first type of authentication technique and provide a second token to the device based on a result of the first payment transaction request, wherein the second token is used for authenticating the second payment transaction request.

In some non-limiting embodiments or aspects, the at least one processor is configured to receive the device registration request and the device attestation response after; the device provides, to a second server, a device attestation request including at least a first token, upon receiving the device registration request including merchant information from the application; and the device receives, from the second server, the device attestation response including at least the device integrity status based on the first token. In some non-limiting embodiments or aspects, providing the device registration response comprises: validating the device attestation response by verifying an origin of the device attestation response using one or more cryptographic techniques based on a first token; and in response to successful validation, sending by the payment server, the device registration response including at least a device identification value to the device; in response to unsuccessful validation, sending by the payment server, the device registration response including at least an error message to the device.

In some non-limiting embodiments or aspects, the at least one processor is configured to receive the enrolment request after a first server receives, via the application and from the device, the enrolment request including at least a consent for registering the application to the first type of authentication technique, merchant information, a payment amount, and payment card information, wherein the at least one processor is configured to provide, to the application, at least one of a payment authentication request and an account identification value upon validation of the payment card information. In some non-limiting embodiments or aspects, receiving the first payment transaction request comprises receiving at least one of a payment authentication request and a payment authorization request from a first server, for completing a transaction associated between a user and a merchant using at least a payment card. In some non-limiting embodiments or aspects, the at least one processor is configured to receive the result of the first payment transaction request after processing of at least one of a payment authentication request and a payment authorization request based on one or more issuer authentication techniques.

In some non-limiting embodiments or aspects, enrolling the device comprises: verifying a first payment authentication response received from the device with a second payment authentication response obtained while facilitating a payment authentication request based on one or more issuer authentication techniques; in response to successful verification, enrolling the device and the application to the first type of authentication technique; and generating the second token for authenticating the second payment transaction request using the first type of authentication technique, wherein the generated second token is provided to the device. In some non-limiting embodiments or aspects, the at least one processor is further configured to: determine one or more authentication techniques associated with at least one issuer; provide one or more determined authentication techniques to an application in a device registered with a payment server, wherein the one or more authentication techniques are displayed in the application for user selection; receive a second payment transaction request with one of the one or more authentication techniques selected by the user; and provide a result of processing the second payment transaction request to the device, wherein the payment server facilitates the processing of the second payment transaction request.

Further non-limiting embodiment or aspects are set forth in the following numbered clauses.

Clause 1: A computer-implemented method comprising: receiving, by at least one processor, a device registration request and a device attestation response including at least a device integrity status from a device; in response to the device registration request, providing, by at least one processor, a device registration response to the device, based on validation of the device integrity status; receiving, by at least one processor, a first payment transaction request and an enrolment request from the device via an application to authenticate a second payment transaction request using a first type of authentication technique; and enrolling, by at least one processor, the device to the first type of authentication technique and providing a second token to the device based on a result of the first payment transaction request, wherein the second token is used for authenticating the second payment transaction request.

Clause 2: The method of clause 1, wherein the device registration request and the device attestation response are received after: the device provides to a second server, a device attestation request including at least a first token, upon receiving the device registration request including merchant information from the application; and the device receives from the second server, the device attestation response including at least the device integrity status based on the first token.

Clause 3: The method of clause 1 or 2, wherein providing the device registration response comprises: validating, by at least one processor, the device attestation response by verifying an origin of the device attestation response using one or more cryptographic techniques based on a first token; and in response to successful validation, sending, by at least one processor, the device registration response including at least a device identification value to the device; and in response to unsuccessful validation, sending, by at least one processor, the device registration response including at least an error message to the device.

Clause 4: The method of any of clauses 1-3, wherein the enrolment request is received after a first server receives, via the application and from the device, the enrolment request including at least one of a consent for registering the application to the first type of authentication technique, merchant information, a payment amount and payment card information, wherein the at least one processor provides to the application at least one of a payment authentication request and an account identification value upon validation of the payment card information.

Clause 5: The method of any of clauses 1-4, wherein receiving the first payment transaction request comprises receiving, by at least one processor, at least one of a payment authentication request and a payment authorization request from a first server for completing a transaction associated between a user and a merchant using at least a payment card.

Clause 6: The method of any of clauses 1-5, wherein the result of the first payment transaction request is received by at least one processor after facilitating, by at least one processor, processing of at least one of a payment authentication request and a payment authorization request based on one or more issuer authentication techniques.

Clause 7: The method of any of clauses 1-6, wherein the enrollment of the device comprises: verifying, by at least one processor, a first payment authentication response received from the device with a second payment authentication response obtained while facilitating a payment authentication request based on one or more issuer authentication techniques; in response to successful verification, enrolling the device and the application to the first type of authentication technique; and generating the second token for authenticating the second payment transaction request using the first type of authentication technique, wherein the generated second token is provided to the device.

Clause 8: A computer-implemented method comprising: determining, by at least one processor, one or more authentication techniques associated with at least one issuer; providing, by at least one processor, one or more determined authentication techniques to an application in a device registered with a payment server, wherein the one or more authentication techniques are displayed in the application for user selection; receiving, by at least one processor, a second payment transaction request with one of the one or more authentication techniques selected by a user; and providing, by at least one processor, a result of processing the second payment transaction request to the device, wherein the payment server facilitates the processing of the second payment transaction request.

Clause 9: The method of clause 8, wherein determining the one or more authentication techniques comprises: receiving, by at least one processor and from the at least one issuer, a consent or a dissent for authenticating the second payment transaction request using the one or more authentication techniques; and identifying, by at least one processor, the one or more authentication techniques having the consent of the at least one issuer.

Clause 10: The method of clause 8 or 9, wherein the one or more authentication techniques comprise at least one of a first type of authentication technique and one or more issuer authentication techniques.

Clause 11: The method of any of clauses 8-10, wherein providing the one or more authentication techniques to the application comprises: computing, by at least one processor, a risk value for each of the determined one or more authentication techniques based on at least one of merchant information, issuer information, and user information; and modifying the consent of the determined one or more authentication techniques based on the computed risk value, wherein the determined one or more authentication techniques are provided to the application.

Clause 12: The method of any of clauses 8-11, wherein facilitating the processing the second payment transaction request when the one of the one or more authentication techniques selected by a user is a first type of authentication technique comprises: receiving, by at least one processor, the second payment transaction request including at least a device attestation response, a payment amount, a second token, merchant information, payment card information, a payment authentication request, and a payment authorization request; and generating, by at least one processor, a third token upon processing the payment authentication request and the payment authorization request, wherein the generated third token is provided to the device for authenticating a third payment transaction.

Clause 13: A payment server for authenticating digital transactions, comprising: at least one processor; and a memory communicatively coupled to the at least one processor, wherein the memory stores processor instructions, which, upon execution, causes the at least one processor to: receive a device registration request and a device attestation response including at least a device integrity status from a device; in response to the device registration request, provide a device registration response to the device, based on validation of the device integrity status; receive a first payment transaction request and an enrolment request from the device via an application to authenticate a second payment transaction request using a first type of authentication technique; and enroll the device to the first type of authentication technique and provide a second token to the device based on a result of the first payment transaction request, wherein the second token is used for authenticating the second payment transaction request.

Clause 14: The payment server of clause 13, wherein the at least one processor is configured to receive the device registration request and the device attestation response after: the device provides, to a second server, a device attestation request including at least a first token, upon receiving the device registration request including merchant information from the application; and the device receives, from the second server, the device attestation response including at least the device integrity status based on the first token.

Clause 15: The payment server of clause 13 or 14, wherein providing the device registration response comprises: validating the device attestation response by verifying an origin of the device attestation response using one or more cryptographic techniques based on a first token; and in response to successful validation, sending by the payment server, the device registration response including at least a device identification value to the device; in response to unsuccessful validation, sending by the payment server, the device registration response including at least an error message to the device.

Clause 16: The payment server of any of clauses 13-15, wherein the at least one processor is configured to receive the enrolment request after a first server receives, via the application and from the device, the enrolment request including at least a consent for registering the application to the first type of authentication technique, merchant information, a payment amount, and payment card information, wherein the at least one processor is configured to provide, to the application, at least one of a payment authentication request and an account identification value upon validation of the payment card information.

Clause 17: The payment server of any of clauses 13-16, wherein receiving the first payment transaction request comprises receiving at least one of a payment authentication request and a payment authorization request from a first server, for completing a transaction associated between a user and a merchant using at least a payment card.

Clause 18: The payment server of any of clauses 13-17, wherein the at least one processor is configured to receive the result of the first payment transaction request after processing of at least one of a payment authentication request and a payment authorization request based on one or more issuer authentication techniques.

Clause 19: The payment server of any of clauses 13-18, wherein enrolling the device comprises: verifying a first payment authentication response received from the device with a second payment authentication response obtained while facilitating a payment authentication request based on one or more issuer authentication techniques; in response to successful verification, enrolling the device and the application to the first type of authentication technique; and generating the second token for authenticating the second payment transaction request using the first type of authentication technique, wherein the generated second token is provided to the device.

Clause 20: The payment server of any of clauses 13-19, wherein the at least one processor is further configured to: determine one or more authentication techniques associated with at least one issuer; provide one or more determined authentication techniques to an application in a device registered with a payment server, wherein the one or more authentication techniques are displayed in the application for user selection; receive a second payment transaction request with one of the one or more authentication techniques selected by a user; and provide a result of processing the second payment transaction request to the device, wherein the payment server facilitates the processing of the second payment transaction request.

In some non-limiting embodiments or aspects, disclosed herein is a computer-implemented method for enrolling a device to a first type of authentication technique. The method includes receiving a device registration request and a device attestation response including at least a device integrity status from a device. Further, the method includes providing, in response to the device registration request, a device registration response to the device based on validation of the device integrity status. Furthermore, the method includes receiving a first payment transaction request and an enrolment request from the device via an application to authenticate second payment transaction request using a first type of authentication technique. Finally, the method includes enrolling the device to the first type of authentication technique and providing a second token to the device based on a result of the first payment transaction request, where the second token is used for authenticating the second payment transaction request.

Further, in some non-limiting embodiments or aspects, the present disclosure may include a computer-implemented method for authenticating the second payment transaction using one or more authentication techniques. The method includes determining one or more authentication techniques associated with at least one issuer. Further, the method includes providing the determined one or more authentication techniques to an application in a device registered with a payment server, where the one or more authentication techniques are displayed in the application for user selection. Furthermore, the method includes receiving a second payment transaction request with one of the one or more authentication techniques selected by the user. Finally, the method includes providing a result of processing the second payment transaction request to the device, where the payment server facilitates the processing of the second payment transaction request.

Furthermore, in some non-limiting embodiments or aspects, the present disclosure may include a payment server for enrolling a device to a first type of authentication technique. The payment server includes at least one processor and a memory communicatively coupled to the at least one processor, where the memory stores the at least one processor instructions, which, on execution, causes the at least one processor to receive a device registration request and a device attestation response including at least a device integrity status from a device. Further, the at least one processor is configured to provide in response to the device registration request, a device registration response to the device, based on validation of the device integrity status. Furthermore, the at least one processor is configured to receive a first payment transaction request and an enrolment request from the device via an application to authenticate second payment transaction request using a first type of authentication technique. Finally, the at least one processor is configured to enroll the device to the first type of authentication technique and provide a second token to the device based on a result of the first payment transaction request, where the second token is used for authenticating the second payment transaction request.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4A shows an exemplary device attestation response received from a second server, in accordance with some non-limiting embodiments or aspects of the present disclosure;

FIG. 4B shows an exemplary device integrity status determined using the device attestation response, in accordance with some non-limiting embodiments or aspects of the present disclosure;

FIG. 6B shows an exemplary priority associated with the one or more authentication techniques received from the at least one issuer, in accordance with some non-limiting embodiments or aspects of the present disclosure;

Figure 1:
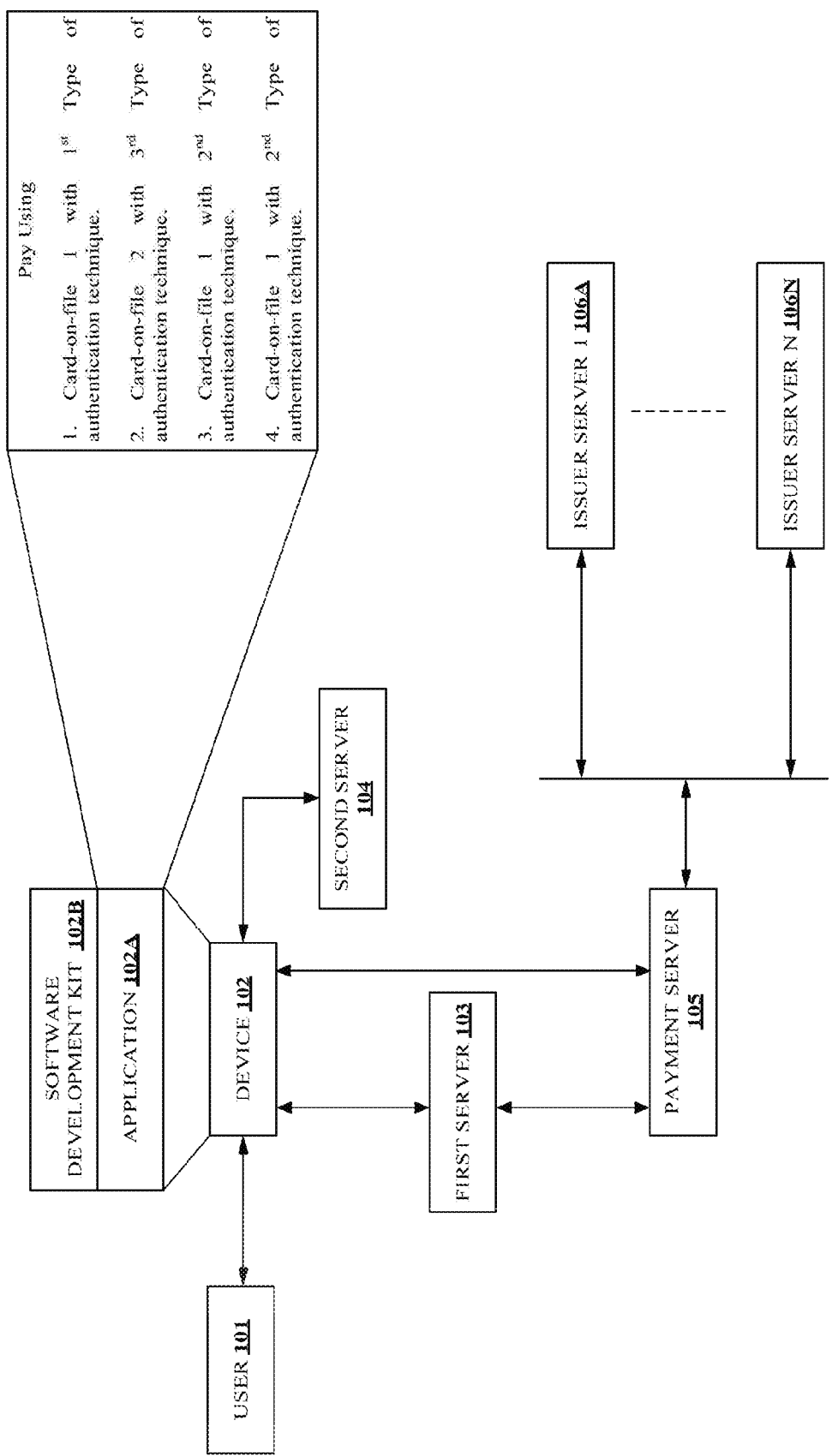
FIG. 1 shows an exemplary environment for authenticating digital transactions, in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but is not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a system and computer-implemented method for authenticating digital transactions. In some non-limiting embodiments or aspects, the method includes receiving a device registration request and a device attestation response including at least a device integrity status from a device. In response to the device registration request, the method includes providing a device registration response to the device, based on validation of the device integrity status. Further, the method includes receiving a first payment transaction request and an enrolment request from the device via an application to authenticate second payment transaction request using a first type of authentication technique. Finally, the method includes enrolling the device to the first type of authentication technique and providing a second token to the device based on a result of the first payment transaction request, wherein the second token is used for authenticating the second payment transaction request.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for enrolling a device to a first type of authentication technique in accordance with some non-limiting embodiments or aspects of the present disclosure. In some implementations, a user (101) may enroll a device (102) with a payment server (105) to a first type of authentication technique while performing an online payment including a first payment transaction. For example, the device (102) may be a smartphone, a tablet computer, a laptop, and the like. The user (101) may perform the online payment using an application (102A) in the device (102). For example, the application (102A) may be an e-commerce application, a Quick Response (QR) code scanning application, a payment application, and the like.

In some non-limiting embodiments or aspects, the application (102A) may be associated with a merchant. The first payment transaction may be based on a card-on-file transaction, where the card-on-file indicates payment card details stored in the application (102A) or in a first server (103) associated with the application (102A). In some non-limiting embodiments or aspects, the application (102A) may prompt the user (101) for enrolling the device (102) to the first type of authentication technique. In some non-limiting embodiments or aspects, the user (101) may select the card-on-file associated with a payment card among a plurality of payment cards stored in the application (102A) for enrolling the device (102) and the selected payment card for the first type of authentication technique. The application (102A) may provide a device registration request including merchant information and the payment card details to a software development kit (SDK) (102B) in the device (102). For example, the SDK (102B) may be one of Java® Development kit, .NET® framework SDK, iOS® SDK, and the like. The SDK (102B) in the device (102) generates a device attestation request including at least a first token or a nonce and provides the device attestation request to a second server (104). The first token may be a pseudo random number generated using one or more cryptographic techniques, for example "A286G91SU". The second server (104) provides a device attestation response including at least a device integrity status based on the first token to the SDK (102B) in the device (102). For example, the device integrity status may be indicative of any tampering in the operating system of the device (102) and the application (102A).

A payment server (105) receives the device registration request and the device attestation response including at least the device integrity status from the device (102) via the application (102A) and the SDK (102B). The payment server (105) validates the device attestation response by verifying an origin of the device attestation response using one or more cryptographic techniques (e.g., a digital signature technique) based on a first token. In response to the device registration request, the payment server (105), in response to successful validation of the device attestation response, provides a device registration response including at least a device identification value to the device (102). The device (102) provides the device registration response to the application (102A) via the SDK (102B).

In some non-limiting embodiments or aspects, the payment server (105) receives the first payment transaction request and an enrolment request from the device (102) via an application (102A) and the first server (103). The enrolment request includes at least one of a consent for registering the application (102A) to the first type of authentication technique, merchant information, a payment amount, and payment card information. The enrolment request including the consent enables the payment server (105) to authenticate a second payment transaction request using the first type of authentication technique. The payment server (105) upon validation of the payment card information provides to the application (102A) via the first server (103) at least one of a payment authentication request and an account identification value. The application (102A) via the first server (103) initiates the first payment transaction request including at least one of the payment authentication request and a payment authorization request for completing a transaction associated between a user (101) and a merchant using at least the payment card.

In some non-limiting embodiments or aspects, the payment server (105) facilitates processing of at least one of the payment authentication request and the payment authorization request based on one or more issuer authentication techniques. For example, the one or more issuer authentication techniques may be a 3-D Secure (3DS) technique. The person skilled in the art may appreciate the use of a static password, a One Time Password (OTP), and/or a Personal Identification Number (PIN) to process the payment authentication request and generate a second payment authentication response. The payment server (105) receives a first payment authentication response from the device (102) and the second payment authentication response is obtained while facilitating a payment authentication request based on one or more issuer authentication techniques. In some non-limiting embodiments or aspects, the payment server (105) facilitates the payment authentication request using a third server (not shown in the figure). For example, the third server may be a Merchant Plug-In (MPI). The third server may interact with the merchant and facilitate processing of the payment authentication request. Further, the payment server (105) compares the first payment authentication response with the second payment authentication response to verify the device (102). Based on a result of the first payment transaction request (e.g., the payment authentication request and the payment authorization request), the payment server (105) enrolls the device (102) and the application (102A) to the first type of authentication technique. The payment server (105) generates a second token for authenticating the second payment transaction request using the first type of authentication technique, where the generated second token is provided to the device (102) via the first server (103), the application (102A), and the SDK (102B).

In some non-limiting embodiments or aspects, the first type of authentication technique may be a network-based authentication technique, where the payment server (105) authenticates the second payment transaction request using the second token. The payment server (105) generates a new token after successful completion of a payment transaction request, where the new token is used for authenticating the subsequent payment transaction request.

In some non-limiting embodiments or aspects, for the user (101) to initiate the second payment transaction using the first type of authentication technique, an issuer server (106A . . . 106N) associated with the payment card needs to provide the consent to authenticate the second payment transaction using the first type of authentication technique to the payment server (105). In some non-limiting embodiments or aspects, the payment server (105) determines one or more authentication techniques associated with at least one issuer by receiving from the at least one issuer via the issuer server (106A . . . 106N) a consent or a dissent for authenticating second payment transaction using the one or more authentication techniques. Further, the payment server (105) identifies the one or more authentication techniques having the consent of the at least one issuer. The one or more authentication techniques includes at least one of a first type of authentication technique, and one or more issuer authentication techniques (e.g., a second type of authentication technique, a third type of authentication technique, and the like). For example, a first issuer may provide a consent to first type and third type of authentication techniques and a dissent to a second type of authentication technique.

In some non-limiting embodiments or aspects, the payment server (105) provides the determined authentication techniques to the application (102A) in the device (102) registered with a payment server (105) via the first server (103). The application (102A) displays the one or more authentication techniques for user selection to initiate the second payment transaction. Upon the user (101) selecting one of the one or more authentication techniques for the second payment transaction, the payment server (105) receives from the application (102A) via the first server (103) the second payment transaction request with one of the one or more authentication techniques selected by the user (101).

In some non-limiting embodiments or aspects, the payment server (105) facilitates the processing of the second payment transaction request based on the selected one of the one or more authentication techniques. For example, if the selected one of the one or more authentication techniques is first type of authentication technique, the payment server (105) may generate the payment authentication response on behalf of the issuer server (106A . . . 106N) associated with the payment card. Further, the payment server (105) provides a result of processing the second payment transaction request to the application (102A) in the device (102) via the first server (103).

In some non-limiting embodiments or aspects, the first server (103), the second server (104), and the payment server (105) may be communicatively connected to the device (102) via a communication network (not shown in the figure). Further, the first server (103), and the issuer server (106A ... 106N) may be communicatively coupled to the payment server (105) via the communication network (not shown in the figure). Further, the communication network may include, for example, a direct interconnection, an e-commerce network, a peer to peer (P2P) network, a local area network (LAN), a wide area network (WAN), a wireless network (e.g., using Wireless Application Protocol), the Internet, Wi-Fi®, a cellular network, and the like.

Figure 2:
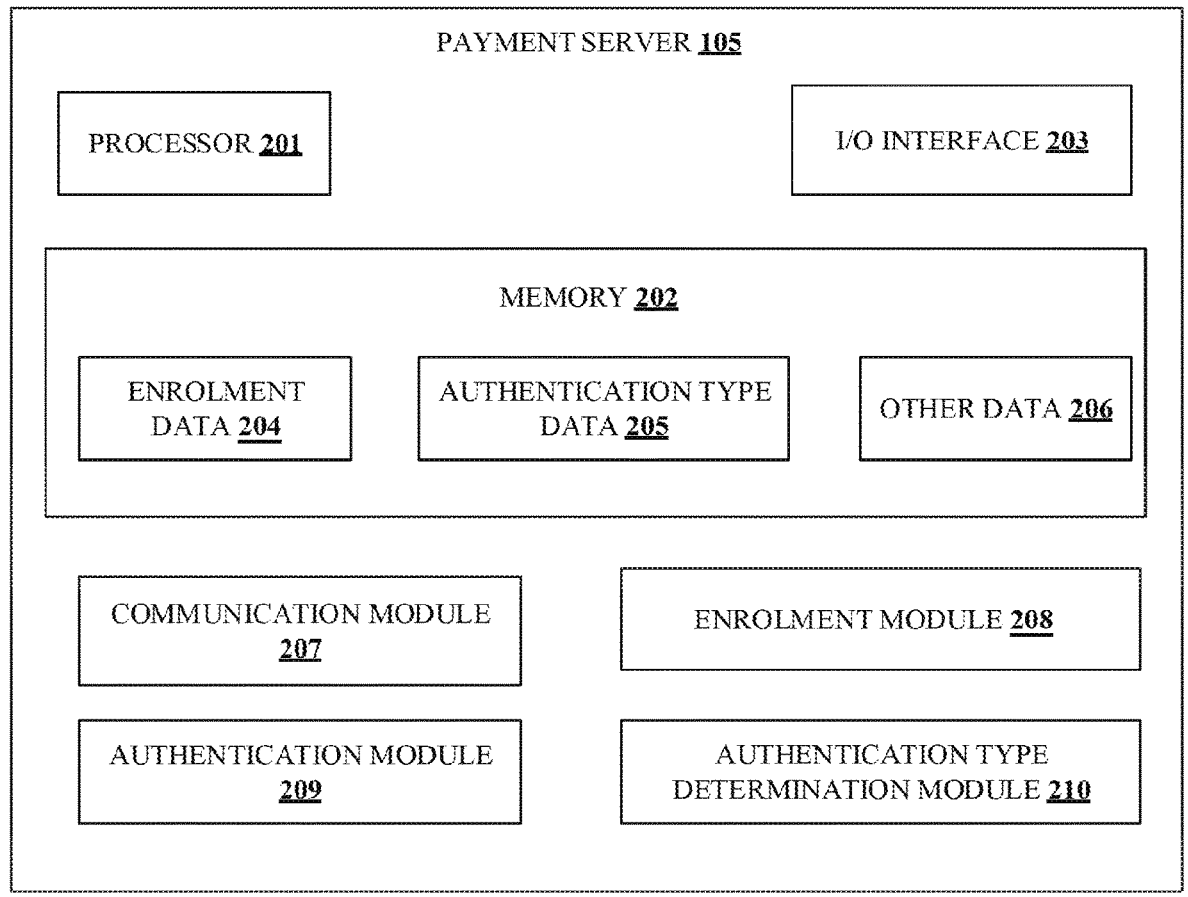
FIG. 2 shows a simplified block diagram of a payment server for authenticating digital transactions, in accordance with some non-limiting embodiments or aspects of the present disclosure.

FIG. 2 shows a simplified block diagram of the payment server (105) for authenticating digital transactions, in accordance with some non-limiting embodiments or aspects of the present disclosure. In some non-limiting embodiments or aspects, the payment server (105) may include at least one Central Processing Unit ("CPU" or "processor") (201) and a memory (202) storing instructions executable by at least one processor (201). The processor (201) may comprise at least one data processor for executing program components for executing user- or system-generated requests. The memory (202) is communicatively coupled to the processor (201). The computing unit (200) further comprises an Input/Output (I/O) interface (203). The I/O interface (203) is coupled with the processor (201) through which an input signal or/and an output signal is communicated. In some non-limiting embodiments or aspects, the data stored in the memory (202) may include enrolment data (204), authentication type data (205), and other data (206). In some non-limiting embodiments or aspects, the enrolment data (204) may include at least one of merchant information, a device identification value, a mobile number associated with the device (102), an authorization code, and the account identification value. The merchant information may include at least one of a merchant card alias, a merchant application identification value, and a merchant customer identification value.

Figure 6A:
FIG. 6A shows an exemplary consent or a dissent received from at least one issuer, in accordance with some non-limiting embodiments or aspects of the present disclosure.

In some non-limiting embodiments or aspects, the authentication type data (205) may include the consent or the dissent associated with the one or more authentication techniques. The consent for the one or more authentication techniques indicates that the second payment transaction may be processed using one or more authentication techniques. The dissent for the one or more authentication techniques indicates the second payment transaction may not be processed using one or more authentication techniques. The consent or the dissent for the one or more authentication techniques is received from the issuer server (106A ... 106N). The authentication type data (205) associated with issuer server (106A ... 106N) is shown in FIG. 6A. In some non-limiting embodiments or aspects, other data (206) may include at least one of the first payment transaction request, the second payment transaction request, one or more cryptographic keys, and the like.

In some non-limiting embodiments or aspects, a communication module (207) is configured to receive the device registration request, the device attestation response, the first payment transaction request, the second payment transaction request, and the enrolment request from one of the device (102) or the first server (103). The communication module (207) is configured to receive, from the at least one issuer via the issuer server (106A ... 106N), a consent or a dissent for authenticating the second payment transaction using the one or more authentication techniques. Further, the communication module (207) is configured to send the device registration response, the second token, the determined authentication techniques, and the result of the second payment transaction to the device (102) via the first server (103).

In some non-limiting embodiments or aspects, an enrolment module (208) is configured to verify the first payment authentication response received from the device (102) with the second payment authentication response obtained while facilitating the payment authentication request based on the one or more issuer authentication techniques. In response to successful verification, the enrolment module (208) is configured to enroll the device (102) and the application (102A) to the first type of authentication technique by storing the merchant information, device identification value, and the account identification value in the enrolment data (204). Further, the enrolment module (208) is configured to generate the second token for authenticating the second payment transaction request using the first type of authentication technique and provide the generated second token to the device (102). In some non-limiting embodiments or aspects, an authentication module (209) is configured to authenticate the first payment transaction, the second payment transaction, and a third payment transaction using the one or more authentication techniques including the first type of authentication technique or one or more issuer authentication techniques.

In some non-limiting embodiments or aspects, an authentication type determination module (210) is configured to receive, from the at least one issuer, a consent or a dissent for authenticating the second payment transaction using the one or more authentication techniques and identifying the one or more authentication techniques having the consent of the at least one issuer to determine the one or more authentication techniques. The authentication type determination module (210) is configured to compute a risk value for each of the determined authentication techniques based on at least one of the merchant information, issuer information, and user information. Based on the computed risk value, the consent of the determined authentication techniques can be modified. Further, the authentication type determination module (210) is configured to provide the determined authentication techniques to the application (102A) for user selection.

Figure 3:
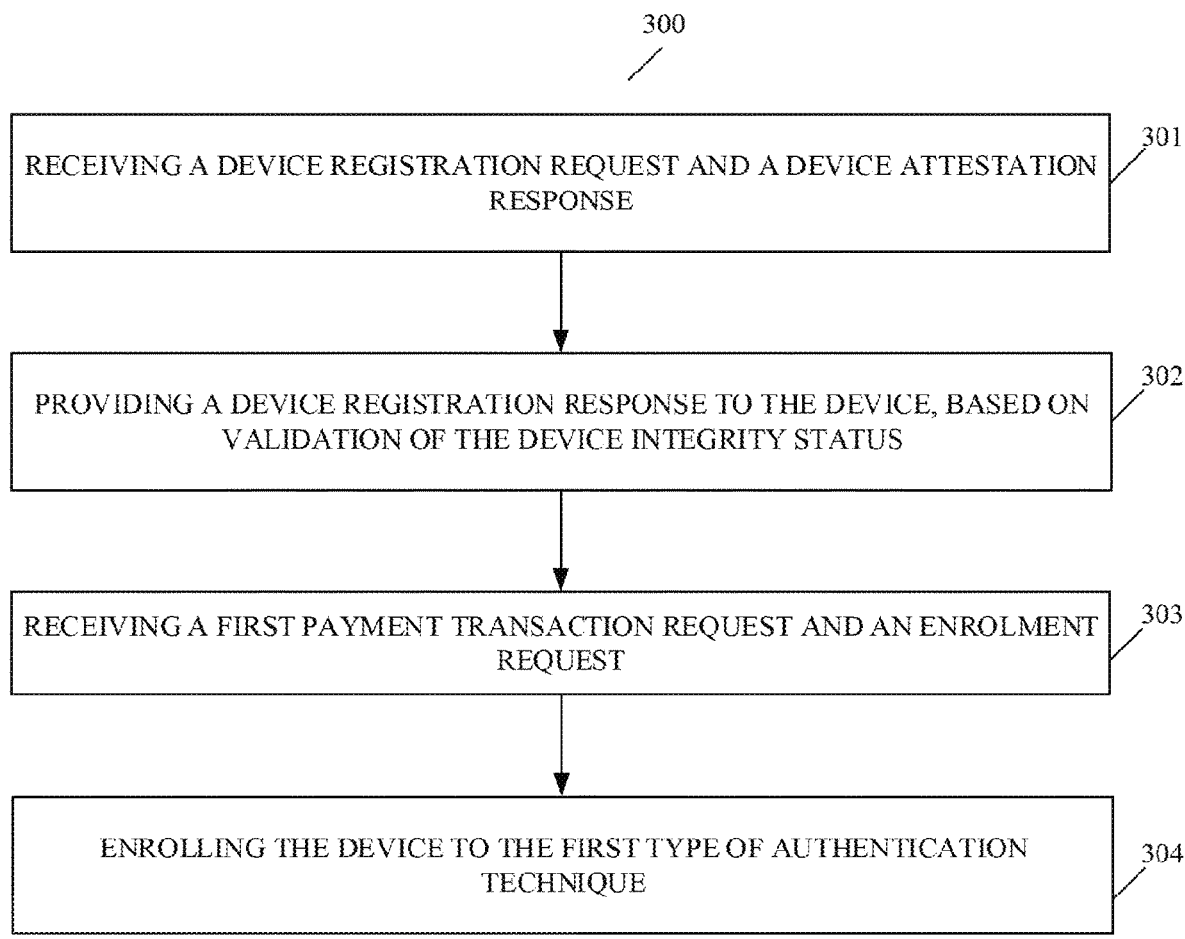
FIG. 3 shows a flow chart illustrating method steps for enrolling a device to a first type of authentication technique, in accordance with some non-limiting embodiments or aspects of the present disclosure.

FIG. 3 shows a flow chart (300) illustrating method steps for enrolling the device (102) to the first type of authentication technique, in accordance with some non-limiting embodiments or aspects of the present disclosure. The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

In some non-limiting embodiments or aspects, and at step (301), the payment server (105), receives the device registration request and the device attestation response including at least the device integrity status from the device (102). In some non-limiting embodiments or aspects, the SDK (102B) in the device (102) provides to the second server (104) the device attestation request including at least the first token, upon receiving the device registration request including at least the merchant information from the application (102A). The first token or nonce is generated in the device (102) by the SDK (102B) using one or more cryptographic techniques. In some non-limiting embodiments or aspects, the first token or nonce is generated by the payment server (105) and provided to the SDK (102B) in the device (102). A person skilled in the art may appreciate the use of one or more pseudo random number generation techniques for generating the first token. For example, the first token may be "R2Rra24fVm5xa2Mg".

In some non-limiting embodiments or aspects, SDK (102B) in the device (102) receives, from the second server (104), the device attestation response including at least the device integrity status based on the first token. For example, the device attestation response (401) shown in FIG. 4A includes a timestamp of the response generated by the second server (104) (e.g., timestamp), the first token or nonce, a name of the application (102A) (e.g., PackageName), a cryptographic hash or digital certificate associated with the application (102A) and/or with the device (102A) indicative of the integrity of the application (102A) (e.g., CertificateDigestSha256), and the device integrity status (e.g., ProfileMatch and Integrity).

The device (102), upon receiving the device attestation response (401) from the second server (104), provides the device registration request and the device attestation response (401) via the SDK (102B). For example, the device registration request may include at least one of a merchant card alias, the application identification value, a merchant customer identification value, the mobile number associated with the device (102), encrypted$_{v\_static\_public\_key}$ (Signed$_{device\_private\_key}$ (first token, device_public_key, device key type, device key size, the device attestation response (401))), and a v_static_public_key reference identification value, where encrypted$_{v\_static\_public\_key}$ indicates an encryption using one or more cryptographic techniques (e.g., public key encryption) using "v_static_public_key" as a public key associated with the payment server (105) and signed$_{device\_private\_key}$ indicates signing using one or more cryptographic techniques (e.g., public key encryption or digital signature techniques) using "device_private_key" as a private key associated with the device (102).

Referring to FIG. 3, at step (302), in response to the device registration request, the payment server (105) provides the device registration response to the device (102), based on validation of the device integrity status. In some non-limiting embodiments or aspects, providing the device registration response includes validating the device attestation response (401) by verifying the origin of the device attestation response (401) using the one or more cryptographic techniques (for example, validating the Secure Sockets Layer (SSL) certificate, a digital signature associated with the device attestation response (401), and the timestamp in the device attestation response (401)) based on the first token. Further, the device integrity status is verified based on the values of "ProfileMatch" and "Integrity" in the device attestation response (401) for the device (102) with an Android® operating system using the exemplary table (402) as shown in FIG. 4B. For example, a true value associated with "ProfileMatch" and "Integrity" is indicative of successful validation of the device (102) and a false value associated with at least one of "ProfileMatch" and/or "Integrity" is indicative of unsuccessful validation of the device (102).

In some non-limiting embodiments or aspects, in response to successful validation, the payment server (105) sends the device registration response including at least a device identification value to the SDK (102B) in the device (102). For example, the device registration response may include encrypted$_{device\_public\_key}$ (Signed$_{v\_static\_private\_key}$ (device identification value, authorization code, v_public_key, v_key type, v_key size)), where encrypted$_{device\_public\_key}$ indicates encryption using one or more cryptographic techniques (e.g., public key encryption) using "device_pub-lic_key" as a public key associated with the device (102) and signed$_{v\_static\_private\_key}$ indicates signing using one or more cryptographic techniques (e.g., public key encryption or digital signature techniques) using "v_static_private_key" as a private key associated with the payment server (105). In response to unsuccessful validation, the payment server (105) may send the device registration response including at least an error message to the SDK (102B) in the device (102). For example, the error message may be indicative of a failure of the device integrity check. In some non-limiting embodiments or aspects, the SDK (102B) in the device (102) provides the encrypted$_{v\_public\_key}$ (authorization code) and signed$_{device\_private\_key}$ (device identification value) to the application (102A) for enrolling to the first type of authentication technique.

Referring to FIG. 3, at step (303), the payment server (105) receives the first payment transaction request and the enrolment request from the device (102) via the application (102A) to authenticate the second payment transaction request using the first type of authentication technique. In some non-limiting embodiments or aspects, the enrolment request is received after the first server (103) receives, via the application (102A) from the device (102), the enrolment request including at least one of the consent for registering the application (102A) to the first type of authentication technique, the merchant information, the payment amount, and the payment card information. For example, the enrolment request may include Primary Account Number (PAN), expiry date associated with the payment card, Card Verification Value (CVV2), the payment amount, a type of currency associated with the payment amount, the consent for registering to the first type of authentication technique, the merchant customer identification value, the merchant application identification value, the mobile number associated with the device (102), signed$_{device\_private\_key}$ (device identification value), encrypted$_{v\_public\_key}$ (authorization code), and merchant card alias.

In some non-limiting embodiments or aspects, upon validation of the payment card information, the payment server (105) provides to the application (102A) in the device (102) via the first server (103) at least one of the payment authentication request and the account identification value. For example, the payment server (105) provides an Access Control Server (ACS) Uniform Resource Locator (URL), the payment authentication request, and the account identification value to the application (102A). The payment server (105) may obtain the ACS URL, the payment authentication request, and the account identification value from the third server (for example, the MPI). The application (102A) in the device (102) initiates the first payment transaction request including the payment authentication request. In some non-limiting embodiments or aspects, the payment server (105) receives the first payment transaction request including at least one of a payment authentication request and a payment authorization request from a first server (103) for completing a transaction associated between a user (101) and a merchant using at least a payment card.

At step (304), the payment server (105) enrolls the device (102) to the first type of authentication technique and provides the second token to the device (102) based on the result of the first payment transaction request, where the second token is used for authenticating the second payment transaction request. In some non-limiting embodiments or aspects, the payment server (105) receives the result of the first payment transaction request after facilitating the processing of at least one of a payment authentication request and a payment authorization request based on one or more issuer authentication techniques. For example, the one or more issuer authentication techniques may be a 3DS technique. The person skilled in the art may appreciate the use of a static password, an OTP, and/or a PIN to process the payment authentication request and generate a second payment authentication response. For example, the second payment authentication response may include the account identification value and the device identification value.

In some non-limiting embodiments or aspects, the enrollment of the device (102) includes verifying, by the payment server (105), the first payment authentication response received from the device (102) with the second payment authentication response obtained while facilitating a payment authentication request based on one or more issuer authentication techniques. For example, the first payment authentication response may include signed$_{device\_private\_key}$ (device identification value), merchant card alias, merchant app id, merchant customer id, encrypted$_{v\_public\_key}$ (signed$_{device\_private\_key}$ (first payment authentication response)), and encrypted$_{v\_public\_key}$ (authorization code). The payment server (105) verifies the first payment authentication response and second authentication response by performing a byte-by-byte check and validating the digital signature associated with the first and second payment authentication responses. The payment server (105), in response to the second payment authentication response, provides Cardholder Authentication Verification Value (CAVV) and Electronic Commerce Indicator (ECI) to the first server (103) indicating a successful authentication of the payment card. The first server (103) initiates the payment authorization request including at least one of the account identification value and VCIND (indicating the first type of authentication technique is used for authenticating the second payment transaction during processing of the payment authorization request). The payment server (105) facilitates the payment authorization request.

In some non-limiting embodiments or aspects, the payment server (105), in response to successful verification, enrolls the device (102) and the application (102A) to the first type of authentication technique. Further, the payment server (105) generates the second token for authenticating the second payment transaction request using the first type of authentication technique, wherein the generated second token is provided to the SDK (102B) in the device (102) via the first server (103). For example, the generated second token provided to the device (102) is of the form signed$_{v\_private\_key}$ (encrypted$_{device\_public\_key}$ (second token)).

Figure 5:
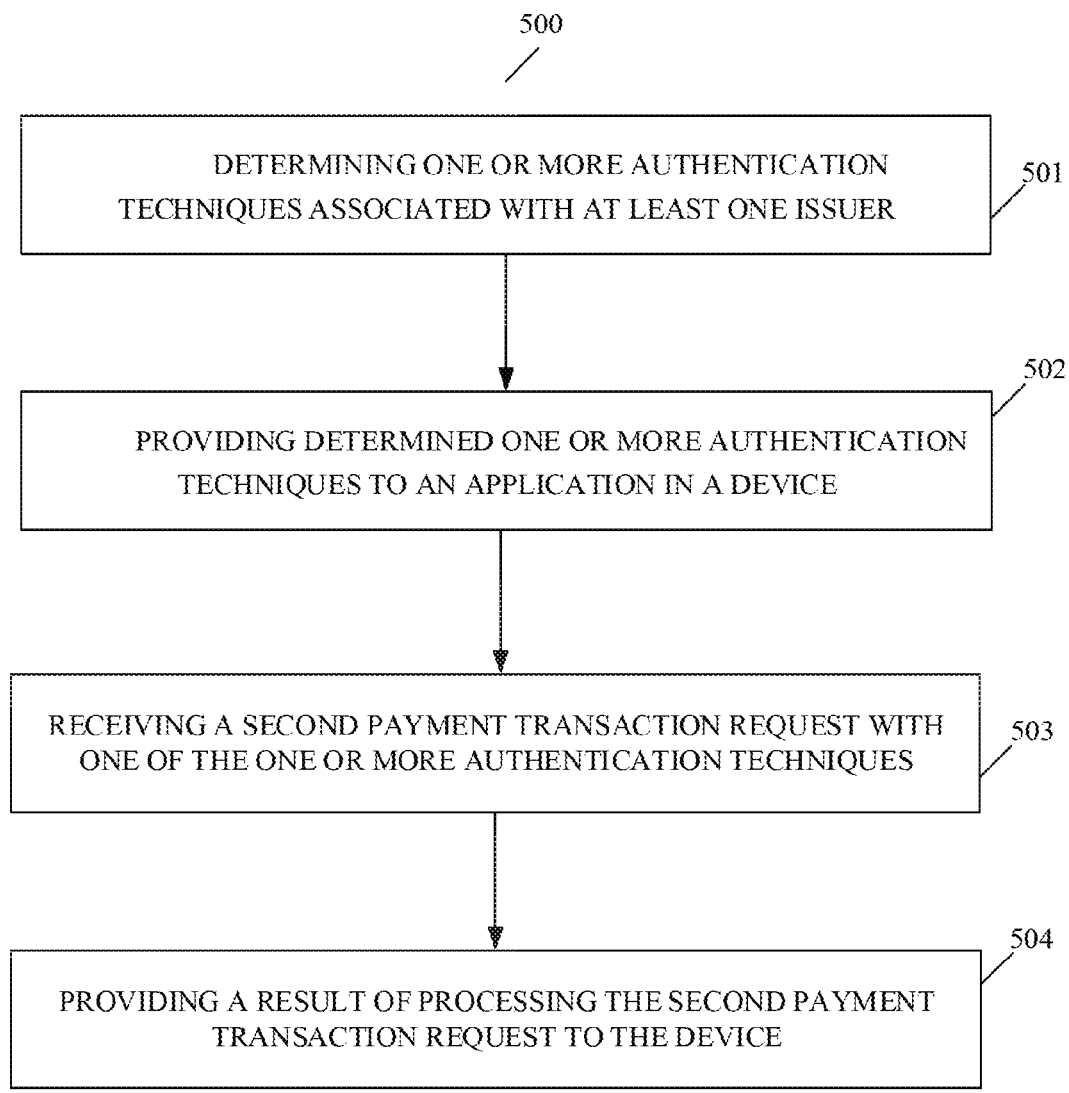
FIG. 5 shows a flow chart illustrating method steps for authenticating a digital transaction using one or more authentication techniques, in accordance with some non-limiting embodiments or aspects of the present disclosure.

FIG. 5 shows a flow chart (500) illustrating method steps for authenticating the digital transaction, in accordance with some non-limiting embodiments or aspects of the present disclosure.

The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At step (501), the payment server (105) determines the one or more authentication techniques associated with the at least one issuer. The one or more authentication techniques include at least one of the first type of authentication technique and the one or more issuer authentication techniques. For example, the first type of authentication technique may be a network authentication technique and the one or more issuer authentication techniques may be the 3DS based authentication technique. In some non-limiting embodiments or aspects, the payment server (105) receives, from the at least one issuer via the issuer server (106A . . . 106N), the consent or the dissent for authenticating the second payment transaction using the one or more authentication techniques. For example, the consent or the dissent (601) received, from at least one issuer via the issuer server (106A . . . 106N), is shown in a table of FIG. 6A. The consent is denoted by "✓" and the dissent is denoted by "x" in FIG. 6A. The payment server (105) identifies the one or more authentication techniques having the consent of the at least one issuer. In some non-limiting embodiments or aspects, the payment server (105) may receive, from the at least one issuer via the issuer server (106A . . . 106N), a priority (602) associated with the one or more authentication techniques having the consent of the at least one issuer as shown in FIG. 6B. The priority (602) associated with the one or more authentication techniques may be indicative of the preferred authentication technique for the second payment transaction based on a success rate associated with one or more previous payment transactions processed by the at least one issuer. For example, "1" may indicate highest priority or the first preferred authentication technique. The priority (602) associated with the one or more authentication techniques may be modified by the at least one issuer after a predefined time interval, for example, 30 minutes.

Figure 6C:
FIG. 6C shows an exemplary association map between the one or more authentication techniques and at least one issuer, in accordance with some non-limiting embodiments or aspects of the present disclosure.

Referring back to FIG. 5, at step (502), the payment server (105) provides the determined authentication techniques to the application (102A) in a device (102) registered with a payment server (105), where the one or more authentication techniques are displayed in the application (102A) for user selection. In some non-limiting embodiments or aspects, the payment server (105) may compute a risk value for each of the determined authentication techniques based on at least one of merchant information, issuer information, and user information. For example, the merchant information may include at least one of merchant card alias, merchant application identification value, merchant customer identification value, acquirer bank details, and the like, the issuer information may include at least one of issuer bank details associated with the payment card and the like, and the user information may include at least one of the PAN, the expiry date associated with the payment card, the CVV2, the mobile number, and the like. Further, the payment server (105) may modify the consent of the determined one or more authentication techniques based on the computed risk value. For example, the payment server (105) modifies the consent associated with the "$3^{rd}$ Authentication Technique" of an "Issuer A" into a dissent based on the computed risk value, as shown in FIG. 6C. The payment server (105) provides determined authentication techniques (603) to the application (102A) in the device (102) for user selection.

Referring back to FIG. 5, at step (503), the payment server (105) receives the second payment transaction request with one of the one or more authentication techniques selected by the user (101). In some non-limiting embodiments or aspects, the second payment transaction request may include at least one of the payment authentication request and the payment authorization request. In some non-limiting embodiments or aspects, if one of the one or more authentication techniques selected by the user (101) are the first type of authentication technique, then the payment server (105) may perform the payment authentication request associated with the second payment transaction. If one of the one or more authentication techniques selected by the user (101) are not the first type of authentication technique, then the payment server (105) may facilitate processing of the payment authentication request associated with the second payment transaction via the at least one issuer associated with the payment card details in the second payment transaction.

At step (504), the payment server (105) provides a result of processing the second payment transaction request to the device (102), where the payment server (105) facilitates the processing of the second payment transaction request. In some non-limiting embodiments or aspects, the payment server (105) facilitates the processing of the second payment transaction request via the at least one issuer associated with the payment card in the second payment transaction request when the one of the one or more authentication techniques selected by the user (101) is not the first type of authentication technique. In this case, the payment authentication request for the second payment transaction request may be processed using the one or more issuer authentication techniques. When the one of the one or more authentication techniques selected by the user (101) are the first type of authentication technique, the payment server (105) receives the second payment transaction request including at least the device attestation response (401), the payment amount, the second token, the merchant information, the payment card information, the payment authentication request and the payment authorization request. For example, the payment server (105) may receive at least one of the PAN, the expiry date associated with the payment card, the payment amount, the type of currency associated with the payment amount, signed$_{device\_private\_key}$ (device identification value), merchant customer identification value, merchant application identification value, encrypted$_{v\_public\_key}$ (Signed$_{device\_private\_key}$ (second token, timestamp, device attestation response (401))), and the first type of authentication technique.

In some non-limiting embodiments or aspects, the payment server (105) generates a third token upon processing the payment authentication request and the payment authorization request associated with the second payment transaction, where the generated third token is provided to the device (102) for authenticating a third payment transaction. In some non-limiting embodiments or aspects, the payment server (105) verifies if the payment amount is less than a predefined amount, for example, 2000INR (USD 28). If the payment amount is less than the predefined amount, the payment server (105) provides CAVV, ECI, signed$_{v\_private\_key}$ (encrypted$_{device\_public\_key}$ (third token)) to the first server (103). The first server (103) initiates the payment authorization request upon receiving the CAVV and the ECI, Further, the encrypted$_{device\_public\_key}$ (third token) is provided to the SDK (102B) in the device (102) for authenticating the third payment transaction.

In some non-limiting embodiments or aspects, the first payment transaction request, the second payment transaction request, and the third payment transaction request initiated by the application (102A) in the device (102) are indicative of the digital transactions. In some non-limiting embodiments or aspects, if the payment amount is greater than the predefined amount, the payment server (105) provides the ACS URL and the payment authentication request to the first server (103) for completing the second payment transaction using the one or more issuer authentication techniques.

The method of authenticating the digital transaction includes enrolling the device (102) and the application (102A) for the first type of authentication technique and authenticating the second payment transaction request using the one of the one or more authentication techniques selected by the user (101). The payment server (105) authenticates the second payment transaction on behalf of the at least one issuer for the first type of authentication technique. The authentication using the first type of authentication technique enables the payment server (105) to perform additional fraud and/or risk checks for the second payment transaction. Further, the first type of authentication technique eliminates the need for a short-message-service based OTP authentication model. The first type of authentication technique provides an increased payment success rate to the user (101). The first type of authentication technique provides security to the digital transactions because of device registration and token-based authentication for every payment transaction. Furthermore, the first type of authentication technique verifies device integrity for every transaction.

Computer System

Figure 7:
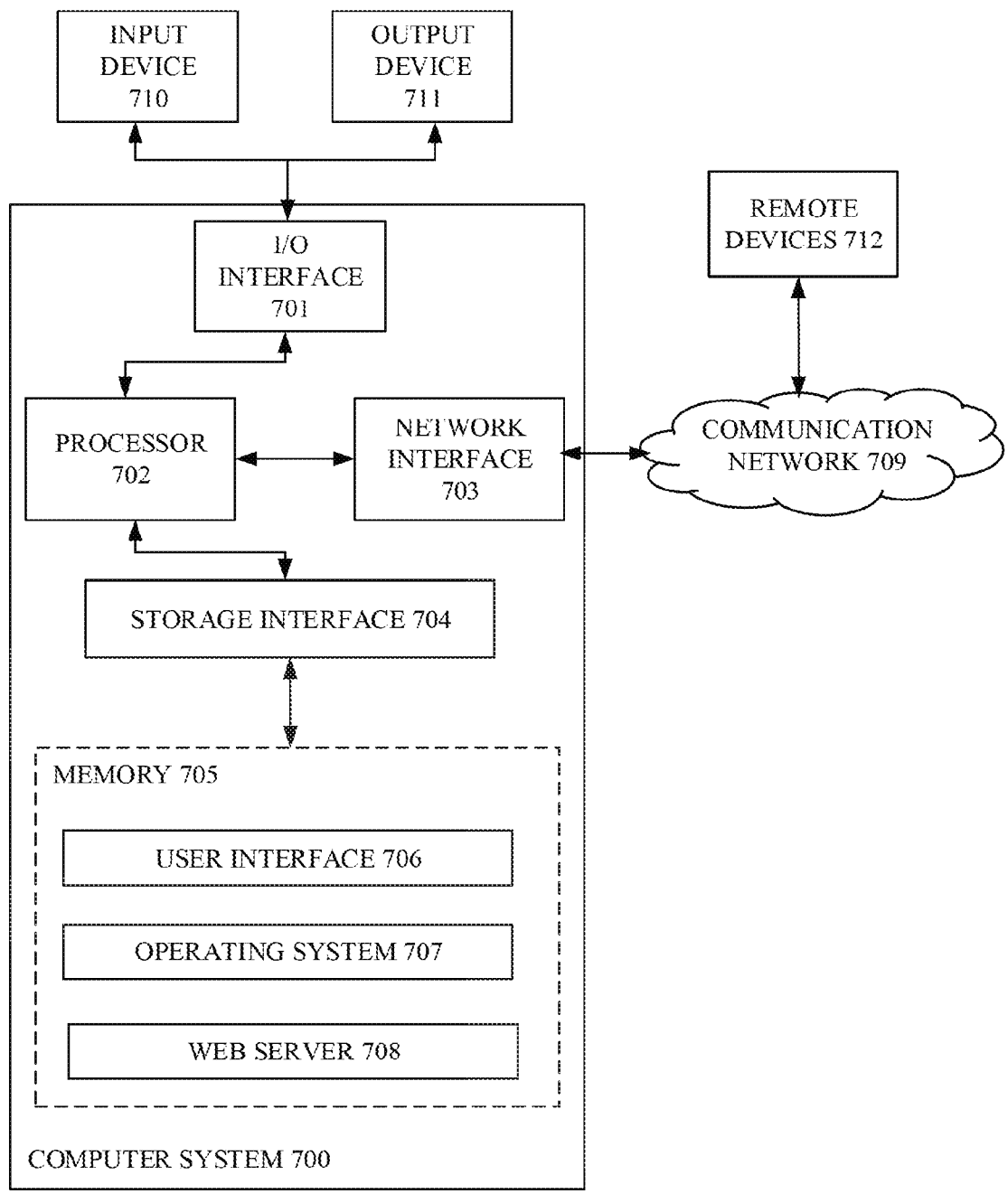
FIG. 7 shows an exemplary computer system for authenticating digital transactions, in accordance with some non-limiting embodiments or aspects of the present disclosure.

FIG. 7 illustrates a block diagram of an exemplary computer system (700) for implementing embodiments consistent with the present disclosure. In some non-limiting embodiments or aspects, the computer system (700) may be used to implement the method for authenticating digital transactions. The computer system (700) may comprise a central processing unit ("CPU" or "processor") (702). The processor (702) may comprise at least one data processor for executing program components for dynamic resource allocation at run time. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via an I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.1 n /b/g/n/x, Bluetooth®, cellular (e.g., code-division multiple access (CDMA), high-speed packet access (HSPA+), global system for mobile communications (GSM), long-term evolution (LTE), WiMax®, or the like), etc.

Using the I/O interface (701), the computer system (700) may communicate with one or more I/O devices. For example, an input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device (711) may be a printer, fax machine, video display (e.g., cathode ray tube (CRT), liquid crystal display (LCD), light-emitting diode (LED), plasma, Plasma display panel (PDP), Organic light-emitting diode display (OLED), or the like), audio speaker, etc.

In some non-limiting embodiments or aspects, the computer system (700) is connected to the service operator through a communication network (709). The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (709) may include, without limitation, a direct interconnection, e-commerce network, a peer to peer (P2P) network, local area network (LAN), wide area network (WAN), wireless network (e.g., using Wireless Application Protocol), the Internet, Wi-Fi®, etc. Using the network interface (703) and the communication network (709), the computer system (700) may communicate with the one or more service operators.

In some non-limiting embodiments or aspects, the processor (702) may be disposed in communication with a memory (705) (e.g., RAM, ROM, etc. not shown in FIG. 7 via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), a web server (708), etc. In some non-limiting embodiments or aspects, computer system (700) may store user/application data, such as the data, variables, records, etc. as described in this disclosure. Such databases may be implemented as fault-tolerant, relational, scalable, secure databases such as Oracle or Sybase.

The operating system (707) may facilitate resource management and operation of the computer system (700). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some non-limiting embodiments or aspects, the computer system (700) may implement a web browser (not shown in the figure) stored program component. The web browser (not shown in the figure) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc. In some non-limiting embodiments or aspects, the computer system (700) may implement a mail server (not shown in the figure) stored program component. The mail server may be an Internet mail server such as Microsoft Exchange, or the like. The mail server (not shown in the figure) may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some non-limiting embodiments or aspects, the computer system (700) may implement a mail client (not shown in the figure) stored program component. The mail client (not shown in the figure) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some non-limiting embodiments or aspects, computer system (700) may receive at least one of the device registration request, the enrolment request, the first payment transaction request, the second payment transaction request, and the one or more authentication techniques from remote devices (712) via the communication network (709).

The terms "an embodiment", "embodiment", "embodiments", "the embodiment", "the embodiments", "one or more embodiments", "some non-limiting embodiments or aspects", and "one embodiment" mean "one or more (but not all) embodiments of the disclosure" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIGS. 3 and 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
   receiving, by at least one processor, a device registration request and a device attestation response including at least a device integrity status from a device;
   in response to the device registration request, providing, by the at least one processor, a device registration response to the device, based on validation of the device integrity status;
   receiving, by the at least one processor from the device via an application, a first payment transaction request and an enrolment request to authenticate a second payment transaction request using a first type of authentication technique; and
   enrolling, by the at least one processor, the device to the first type of authentication technique and providing a second token to the device based on a result of the first payment transaction request, wherein the second token is used for authenticating the second payment transaction request.

2. The method of claim 1, wherein the device registration request and the device attestation response are received after:
   the device provides, to a second server, a device attestation request including at least a first token; and
   the device receives, from the second server, the device attestation response including at least the device integrity status based on the first token.

3. The method of claim 1, wherein providing the device registration response comprises:
   validating, by the at least one processor, the device attestation response by verifying an origin of the device attestation response using one or more cryptographic techniques based on a first token; and
   in response to successful validation, sending, by the at least one processor, the device registration response including at least a device identification value to the device; and
   in response to unsuccessful validation, sending, by the at least one processor, the device registration response including at least an error message to the device.

4. The method of claim 1, wherein the enrolment request is received after:
   a first server receives, via the application and from the device, the enrolment request including at least one of a consent for registering the application to the first type of authentication technique, merchant information, a payment amount, and payment card information, wherein the at least one processor provides to the application at least one of a payment authentication request and an account identification value upon validation of the payment card information.

5. The method of claim 1, wherein receiving the first payment transaction request comprises:
   receiving, by the at least one processor, at least one of a payment authentication request and a payment authorization request from a first server for completing a transaction associated between a user and a merchant using at least a payment card.

6. The method of claim 1, wherein the result of the first payment transaction request is received by the at least one processor after:
   facilitating, by the at least one processor, processing of at least one of a payment authentication request and a payment authorization request based on one or more issuer authentication techniques.

7. The method of claim 1, wherein the enrollment of the device comprises:
   verifying, by the at least one processor, a first payment authentication response received from the device with a second payment authentication response obtained while facilitating a payment authentication request based on one or more issuer authentication techniques;
   in response to successful verification, enrolling the device and the application to the first type of authentication technique; and
   generating the second token for authenticating the second payment transaction request using the first type of authentication technique, wherein the generated second token is provided to the device.

8. A computer-implemented method comprising:
   determining, by at least one processor, one or more authentication techniques associated with at least one issuer;
   providing, by the at least one processor, one or more determined authentication techniques to an application in a device, wherein the one or more authentication techniques are displayed in the application for user selection;
   receiving, by the at least one processor, a second payment transaction request with one of the one or more authentication techniques selected by a user;
   providing, by the at least one processor, a result of processing the second payment transaction request to the device; and
   facilitating, by the at least one processor, the processing of the second payment transaction request,
   wherein facilitating the processing of the second payment transaction request when the one of the one or more authentication techniques selected by the user is a first type of authentication technique comprises:
      receiving, by the at least one processor, the second payment transaction request including at least a device attestation response, a payment amount, a second token, merchant information, payment card information, a payment authentication request, and a payment authorization request; and
      generating, by the at least one processor, a third token upon processing the payment authentication request and the payment authorization request, wherein the generated third token is provided to the device for authenticating a third payment transaction.

9. The method of claim 8, wherein determining the one or more authentication techniques comprises:
   receiving, by the at least one processor and from the at least one issuer, a consent or a dissent for authenticating the second payment transaction request using the one or more authentication techniques; and
   identifying, by the at least one processor, the one or more authentication techniques having the consent of the at least one issuer.

10. The method of claim 8, wherein the one or more authentication techniques comprise at least one of a first type of authentication technique and one or more issuer authentication techniques.

11. The method of claim 8, wherein providing the one or more authentication techniques to the application comprises:
computing, by the at least one processor, a risk value for each of the determined one or more authentication techniques based on at least one of merchant information, issuer information, and user information; and
modifying a consent of the determined one or more authentication techniques to a dissent based on the computed risk value being unacceptable, wherein the determined one or more authentication techniques are provided to the application.

12. A payment server for authenticating digital transactions, comprising:
at least one processor; and
a memory communicatively coupled to the at least one processor, wherein the memory stores processor instructions, which, upon execution, causes the at least one processor to:
receive a device registration request and a device attestation response including at least a device integrity status from a device;
in response to the device registration request, provide a device registration response to the device, based on validation of the device integrity status;
receive, from the device via an application, a first payment transaction request and an enrolment request to authenticate a second payment transaction request using a first type of authentication technique; and
enroll the device to the first type of authentication technique and provide a second token to the device based on a result of the first payment transaction request, wherein the second token is used for authenticating the second payment transaction request.

13. The payment server of claim 12, wherein the at least one processor is configured to receive the device registration request and the device attestation response after:
the device provides, to a second server, a device attestation request including at least a first token; and
the device receives, from the second server, the device attestation response including at least the device integrity status based on the first token.

14. The payment server of claim 12, wherein providing the device registration response comprises:
validating the device attestation response by verifying an origin of the device attestation response using one or more cryptographic techniques based on a first token;
in response to successful validation, sending by the payment server, the device registration response including at least a device identification value to the device; and
in response to unsuccessful validation, sending by the payment server, the device registration response including at least an error message to the device.

15. The payment server of claim 12, wherein the at least one processor is configured to receive the enrolment request after:
a first server receives, via the application and from the device, the enrolment request including at least a consent for registering the application to the first type of authentication technique, merchant information, a payment amount, and payment card information, wherein the at least one processor is configured to provide, to the application, at least one of a payment authentication request and an account identification value upon validation of the payment card information.

16. The payment server of claim 12, wherein receiving the first payment transaction request comprises:
receiving at least one of a payment authentication request and a payment authorization request from a first server, for completing a transaction associated between a user and a merchant using at least a payment card.

17. The payment server of claim 12, wherein the at least one processor is configured to receive the result of the first payment transaction request after processing of at least one of a payment authentication request and a payment authorization request based on one or more issuer authentication techniques.

18. The payment server of claim 12, wherein enrolling the device comprises:
verifying a first payment authentication response received from the device with a second payment authentication response obtained while facilitating a payment authentication request based on one or more issuer authentication techniques;
in response to successful verification, enrolling the device and the application to the first type of authentication technique; and
generating the second token for authenticating the second payment transaction request using the first type of authentication technique, wherein the generated second token is provided to the device.

19. The payment server of claim 12, wherein the at least one processor is further configured to:
determine one or more authentication techniques associated with at least one issuer;
provide one or more determined authentication techniques to an application in a device registered with the payment server, wherein the one or more authentication techniques are displayed in the application for user selection;
receive a second payment transaction request with one of the one or more authentication techniques selected by a user; and
provide a result of processing the second payment transaction request to the device, wherein the payment server facilitates the processing of the second payment transaction request.

* * * * *